(12) United States Patent
Suzuki

(10) Patent No.: US 8,731,564 B2
(45) Date of Patent: May 20, 2014

(54) WIRELESS COMMUNICATION DEVICE AND WIRELESS COMMUNICATION METHOD

(71) Applicant: Fujitsu Mobile Communications Limited, Kawasaki (JP)

(72) Inventor: Shinichiro Suzuki, Hachioji (JP)

(73) Assignee: Fujitsu Mobile Communications Limited, Kawasaki (JP)

(*) Notice: Subject to any disclaimer, the term of this patent is extended or adjusted under 35 U.S.C. 154(b) by 0 days.

(21) Appl. No.: 13/686,797

(22) Filed: Nov. 27, 2012

(65) Prior Publication Data

US 2013/0189981 A1 Jul. 25, 2013

(30) Foreign Application Priority Data

Jan. 25, 2012 (JP) ................................ 2012-013325

(51) Int. Cl.
*H04W 36/00* (2009.01)

(52) U.S. Cl.
USPC ............... 455/437; 455/432.1; 455/435.1; 455/436; 455/440; 455/456.1

(58) Field of Classification Search
USPC ............. 455/432.1, 435.1, 436, 440, 455/456.1–456.2, 457
See application file for complete search history.

(56) References Cited

U.S. PATENT DOCUMENTS

| 5,903,833 | A  | * | 5/1999 | Jonsson et al. | 455/417 |
|---|---|---|---|---|---|
| 6,650,908 | B1 | * | 11/2003 | Coombes et al. | 455/560 |
| 7,251,226 | B2 | * | 7/2007 | Lindsay et al. | 370/331 |
| 7,668,147 | B2 | * | 2/2010 | Lindsay et al. | 370/347 |
| 2006/0072532 | A1 | * | 4/2006 | Dorenbosch et al. | 370/342 |
| 2011/0176510 | A1 | * | 7/2011 | Hallenstal et al. | 370/331 |
| 2012/0190370 | A1 | * | 7/2012 | Takagi et al. | 455/437 |

FOREIGN PATENT DOCUMENTS

JP 2010-068233 A 3/2010

* cited by examiner

*Primary Examiner* — Dai A Phuong
(74) *Attorney, Agent, or Firm* — Maschoff Brennan

(57) ABSTRACT

A location-registration control unit transmits, when handover from a first communication network for performing voice communication and packet communication to a second communication network for performing packet communication is determined to be executed, a location registration request to the second communication network and receives a response to the location registration request from the second communication network. A voice-communication-request acquiring unit puts a voice communication request on hold when acquiring the voice communication request requesting the first communication network for performing voice communication. A voice-communication determining unit determines whether the voice communication request is being put on hold. When it has been determined that the voice communication request is being put on hold, the voice-communication control unit cancels the sending of a reply of completion notification notifying of completion of receipt of the acceptance and transfers the voice communication request being put on hold to the first communication network.

4 Claims, 4 Drawing Sheets

WIRELESS COMMUNICATION DEVICE AND WIRELESS COMMUNICATION METHOD

CROSS-REFERENCE TO RELATED APPLICATION

This application is based upon and claims the benefit of priority of the prior Japanese Patent Application No. 2012-013325, filed on Jan. 25, 2012, the entire contents of which are incorporated herein by reference.

FIELD

The embodiment discussed herein is related to a wireless communication device and a wireless communication method.

BACKGROUND

In recent years, the 3GPP (3rd Generation Partnership Project) and the 3GPP2 (3rd Generation Partnership Project 2), which are standards organizations for third-generation mobile phone standard, have been pursuing the development of specifications of a mobile communication system capable of the co-existence of a plurality of communication networks with different communication methods. As such a mobile communication system, for example, there is known a mobile communication system in which a 1×+HRPD (High Rate Packet Data) network for performing voice communication and packet communication co-exists with an LTE (Long Term Evolution) network for performing packet communication only. In the mobile communication system in which the 1×+HRPD network co-exists with the LTE network, a wireless communication device such as a mobile phone (hereinafter, referred to as "UE (User Equipment)" is assumed to perform handover from the 1×+HRPD network to the LTE network or handover from the LTE network to the 1×+HRPD network.

When performing handover from the 1×+HRPD network to the LTE network, the UE performs location registration to the LTE network beforehand. Namely, the UE transmits an Attach Request which is a signal requesting location registration to the LTE network. Then, the UE, which has transmitted the Attach Request, receives a response signal indicating a response to the Attach Request from the LTE network. When the UE has received an Attach Accept indicating acceptance of the Attach Request as the response signal from the LTE network, the UE sends a reply of an Attach Complete notifying of completion of the receipt of the Attach Accept to the LTE network. With this, the location registration to the LTE network is completed, and after that, a wireless link between the UE and the LTE network is established, so the UE can execute packet communication with the LTE network without performing a location registration procedure.
Japanese Laid-open Patent Publication No. 2010-68233

However, the above-described conventional technology has a problem that when the UE has had a voice communication request during execution of handover to a communication network for performing packet communication only, the execution of voice communication may be obstructed.

Specifically, in the above-described conventional technology, even when the UE has acquired a voice communication request to the 1×+HRPD network before receiving the Attach Accept, upon receipt of the Attach Accept, the UE sends a reply of an Attach Complete to the LTE network. Therefore, in the above-described conventional technology, a wireless link between the UE and the LTE network is established, and voice communication between the UE and the 1×+HRPD network may be obstructed.

SUMMARY

According to an aspect of an embodiment, a wireless communication device includes a location-registration control unit that transmits, when handover from a first communication network for performing voice communication and packet communication to a second communication network for performing packet communication is determined to be executed, a location registration request requesting for location registration to the second communication network and receives a response to the location registration request from the second communication network; a voice-communication-request acquiring unit that puts a voice communication request on hold when acquiring the voice communication request requesting the first communication network for performing voice communication; a voice-communication determining unit that determines whether the voice communication request acquired by the voice-communication-request acquiring unit is being put on hold when the response received by the location-registration control unit is acceptance of the location registration request; and a voice-communication control unit that sends a reply of completion notification notifying of completion of receipt of the acceptance to the second communication network when the voice-communication determining unit has determined that the voice communication request is not being put on hold, or cancels the sending of the reply of completion notification and transfers the voice communication request being put on hold to the first communication network when the voice-communication determining unit has determined that the voice communication request is being put on hold.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT

Preferred embodiments of the present invention will be explained with reference to accompanying drawings.

Incidentally, the present invention is not limited to an embodiment described below.

Figure 1:
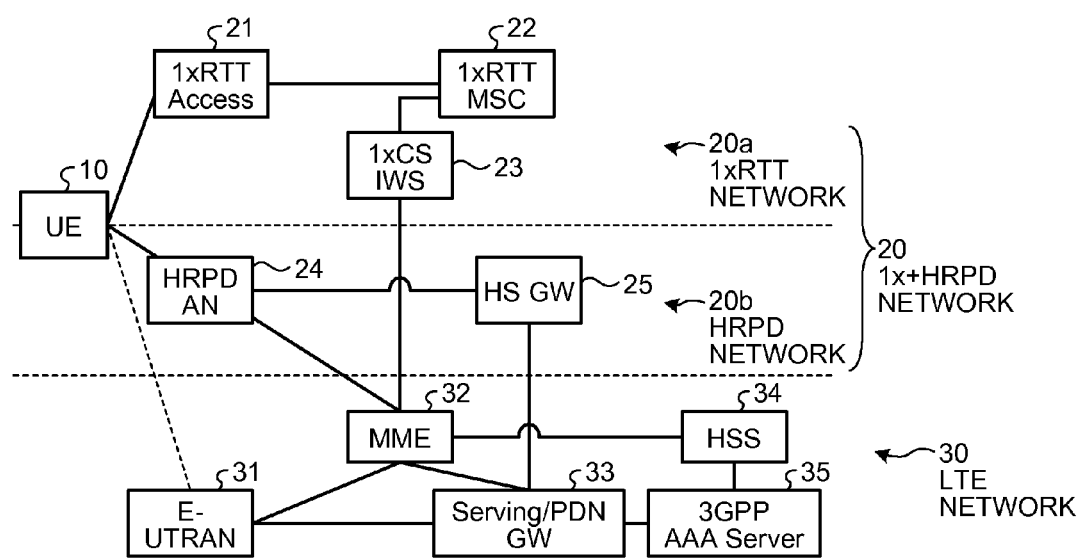
FIG. 1 is a diagram illustrating a configuration example of a mobile communication system including a wireless communication device according to a present embodiment.

First, a mobile communication system including a wireless communication device according to the present embodiment is explained with reference to FIG. 1. FIG. 1 is a diagram illustrating a configuration example of the mobile communication system including the wireless communication device according to the present embodiment.

The mobile communication system illustrated in FIG. 1 includes a wireless communication device (hereinafter, referred to as "UE (User Equipment)" 10, a 1x+HRPD (High Rate Packet Data) network 20, and an LTE (Long Term Evolution) network 30.

The UE 10 is a movable wireless communication device, and, for example, is a mobile phone terminal. The UE 10 implements wireless communication with the 1x+HRPD network 20 and the LTE network 30. For example, the UE 10 establishes a wireless link with the 1x+HRPD network 20 and performs voice communication or packet communication with the 1x+HRPD network 20. Furthermore, for example, the UE 10 performs handover from the 1x+HRPD network 20 to the LTE network 30, thereby the UE 10 can establish a wireless link with the LTE network 30 and perform packet communication with the LTE network 30.

The 1x+HRPD network 20 is a communication network for performing voice communication and packet communication. Specifically, the 1x+HRPD network 20 includes a 1xRTT (1xRadio Transmission Technology) network 20a and an HRPD network 20b.

The 1xRTT network 20a is a communication network for performing voice communication with the UE 10 using a circuit-switched connection method. Specifically, the 1xRTT network 20a includes a 1xRTT Access 21, a 1xRTT MSC (Mobile Switching Center) 22, and a 1xCS IWS (Circuit Switching Inter Work System) 23. The 1xRTT Access 21 is a base station unit that provides a wireless link for connection to the 1xRTT network 20a to the UE 10. The 1xRTT MSC 22 is a switching center connected to a public network, and establishes a circuit-switched connection between the UE 10 connected to the 1xRTT network 20a via the 1xRTT Access 21 and the public network. The 1xCS IWS 23 relays a message exchanged between the 1xRTT MSC 22 and an MME 32.

The HRPD network 20b is a communication network for performing packet communication with the UE 10 using a packet-switched connection method. Specifically, the HRPD network 20b includes an HRPD AN (Access Node) 24 and an HS GW (HRPD Serving Gateway) 25. The HRPD AN 24 is a base station unit that provides a wireless link for connection to the HRPD network 20b to the UE 10. The HS GW 25 is a node connected to an external PDN (Packet Data Network), and establishes a packet-switched connection between the UE 10 connected to the HRPD network 20b via the HRPD AN 24 and the PDN.

The LTE network 30 is a communication network for performing packet communication with the UE 10 using a packet-switched connection method. Specifically, the LTE network 30 includes an E-UTRAN (Evolved Universal Terrestrial Radio Access Network) 31, the MME (Mobility Management Entity) 32, and a Serving/PDN GW 33. Furthermore, the LTE network 30 includes an HSS (Home Subscriber Server) 34 and a 3GPP AAA Server (3GPP Authentication Authorization Accounting Server) 35. The E-UTRAN 31 is a base station unit that provides a wireless link for connection to the LTE network 30 to the UE 10. The MME 32 is a node that manages location registration of the UE 10 and the like. The Serving/PDN GW 33 is a node connected to an external PDN, and establishes a packet-switched connection between the UE 10 connected to the LTE network 30 via the E-UTRAN 31 and the PDN. The HSS 34 is a node that manages subscriber information. The 3GPP AAA Server 35 is a node responsible for connection authentication.

When the UE 10 according to the present embodiment has determined to perform handover from the 1x+HRPD network 20 to the LTE network 30, the UE 10 performs the following process. That is, the UE 10 first transmits an Attach Request which is a signal requesting location registration to the LTE network 30. Then, when having received an Attach Accept indicating acceptance of the Attach Request as a response signal from the LTE network 30, the UE 10 determines whether a voice communication request to the 1xRTT network 20a has been acquired.

When having acquired no voice communication request, the UE 10 sends a reply of an Attach Complete notifying of completion of the receipt of the Attach Accept to the LTE network 30. This establishes a wireless link between the UE 10 and the LTE network 30 and enables the UE 10 to execute packet communication with the LTE network 30.

On the other hand, when a voice communication request has been acquired, the UE 10 cancels sending a reply of an Attach Complete to the LTE network 30 and transfers the acquired voice communication request to the 1xRTT network 20a. This establishes a wireless link between the UE 10 and the 1xRTT network 20a and enables the UE 10 to execute voice communication with the 1xRTT network 20a.

In this manner, when the UE 10 according to the present embodiment has acquired a voice communication request to the 1xRTT network 20a before receiving the Attach Accept, the UE 10 cancels sending a reply of an Attach Complete to the LTE network 30 and transfers the voice communication request to the 1xRTT network 20a. Therefore, even when having had a voice communication request during execution of handover to the LTE network 30 for performing packet communication, the UE 10 according to the present embodiment can suspend the handover and continue to perform voice communication processing, and consequently can properly execute the voice communication.

Figure 2:
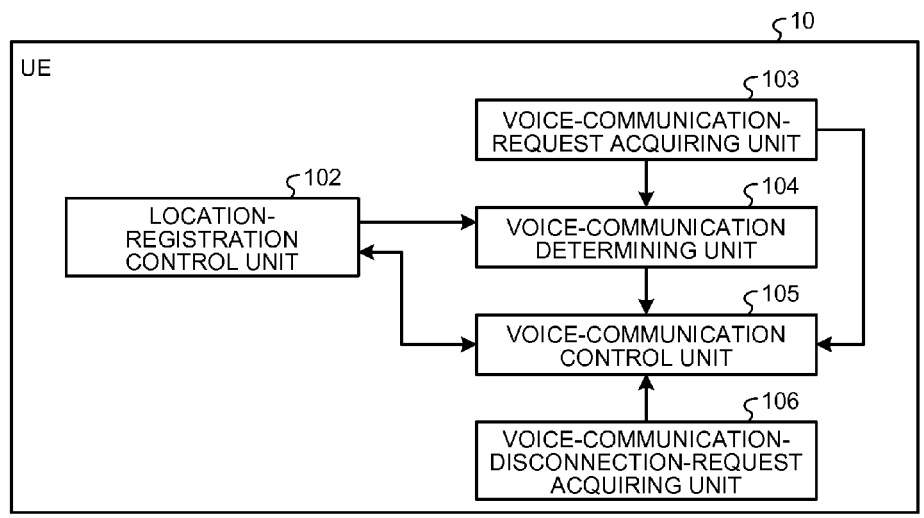
FIG. 2 is a functional block diagram illustrating a configuration of the wireless communication device (UE) according to the present embodiment.

Subsequently, a configuration of the UE 10 according to the present embodiment is explained with reference to FIG. 2. FIG. 2 is a functional block diagram illustrating the configuration of the wireless communication device (UE) 10 according to the present embodiment. As illustrated in FIG. 2, the UE 10 includes a location-registration control unit 102, a voice-communication-request acquiring unit 103, a voice-communication determining unit 104, a voice-communication control unit 105, and a voice-communication-disconnection-request acquiring unit 106.

When handover from the 1x+HRPD network 20 for performing voice communication and packet communication to the LTE network 30 for performing packet communication has been determined to be executed, the location-registration control unit 102 transmits an Attach Request to the LTE network 30 and receives a response to the Attach Request from the LTE network 30. Incidentally, when received power of a signal transmitted from the HRPD network 20b becomes lower than a prescribed value, and when received power of a signal transmitted from the LTE network 30 is higher than a prescribed value, handover from the 1x+HRPD network 20 to the LTE network 30 is determined to be executed. When the response received from the LTE network 30 is an Attach Accept indicating acceptance of the Attach Request, the location-registration control unit 102 notifies the voice-communication determining unit 104 of the response of an Attach Accept. On the other hand, when the response received from the LTE network 30 is an Attach Reject indicating rejection of the Attach Request, the location-registration control unit 102 notifies the voice-communication control unit 105 of the response of an Attach Reject.

Furthermore, when a voice-communication disconnection request has been transferred to the 1×RTT network 20a by the voice-communication control unit 105 to be described later, the location-registration control unit 102 retransmits the Attach Request to the LTE network 30.

The voice-communication-request acquiring unit 103 acquires a voice communication request requesting the 1×RTT network 20a of the 1×+HRPD network 20 for the execution of voice communication. For example, the voice-communication-request acquiring unit 103 acquires a voice communication request by accepting a user operation made through a user interface (UI) unit, such as an operation unit of the UE 10. When having acquired a voice communication request, the voice-communication-request acquiring unit 103 acquires information indicating whether or not it is in the process of location registration (waiting for an Attach Accept) from the location-registration control unit 102 before transmitting the acquired voice communication request to the 1×RTT network. When it is in the process of location registration, the voice-communication-request acquiring unit 103 puts the voice communication request on hold; on the other hand, when it is not in the process of location registration, the voice-communication-request acquiring unit 103 transmits the acquired voice communication request to the 1×RTT network.

The voice-communication determining unit 104 performs the following process when having received a notification that a response received from the LTE network 30 is an Attach Accept indicating acceptance of an Attach Request from the location-registration control unit 102. That is, the voice-communication determining unit 104 determines whether a voice communication request acquired by the voice-communication-request acquiring unit 103 is being put on hold. Then, the voice-communication determining unit 104 notifies the voice-communication control unit 105 of a result of the determination of whether the voice communication request is being put on hold.

The voice-communication control unit 105 receives a determination result from the voice-communication determining unit 104. When having received a determination result indicating that a voice communication request is not being put on hold, the voice-communication control unit 105 sends a reply of an Attach Complete notifying of completion of the receipt of an Attach Accept to the LTE network 30. On the other hand, when having received a determination result indicating that a voice communication request is being put on hold, the voice-communication control unit 105 cancels sending a reply of an Attach Complete to the LTE network 30. Then, the voice-communication control unit 105 transfers the voice communication request being put on hold in the voice-communication-request acquiring unit 103 to the 1×RTT network 20a of the 1×+HRPD network 20.

Furthermore, when having received a notification that a response received from the LTE network 30 is an Attach Reject indicating rejection of an Attach Request from the location-registration control unit 102, the voice-communication control unit 105 performs the following process. That is, the voice-communication control unit 105 transfers a voice communication request being put on hold in the voice-communication-request acquiring unit 103 to the 1×RTT network 20a.

Moreover, the voice-communication control unit 105 transfers a voice-communication disconnection request acquired by the voice-communication-disconnection-request acquiring unit 106 to the 1×RTT network 20a.

The voice-communication-disconnection-request acquiring unit 106 acquires a voice-communication disconnection request requesting for disconnection of voice communication performed by the 1×RTT network 20a. For example, the voice-communication-disconnection-request acquiring unit 106 acquires a voice-communication disconnection request by accepting a user operation made through a UI unit, such the operation unit of the UE 10.

Figure 3:
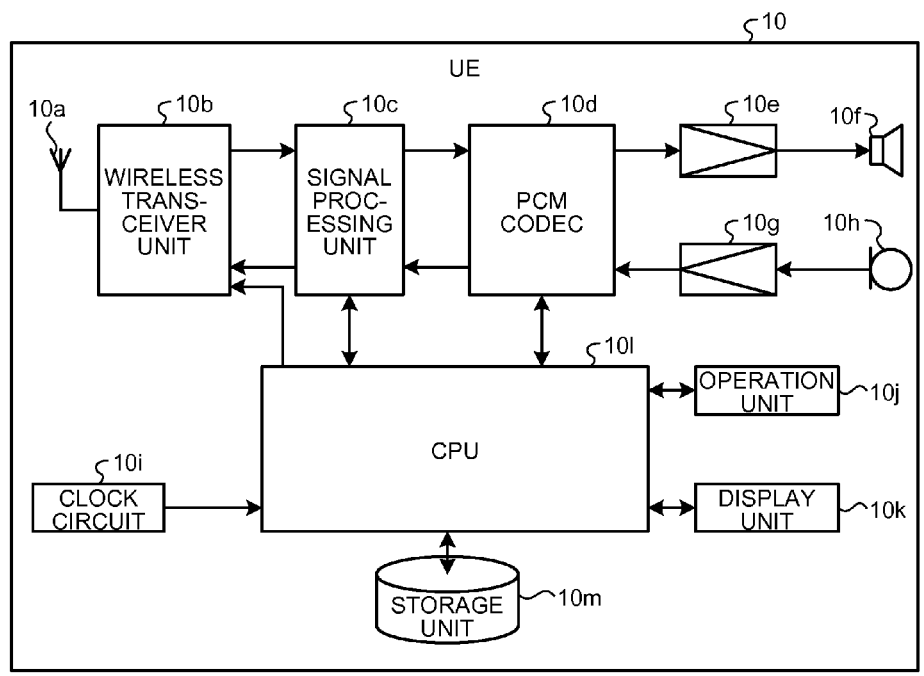
FIG. 3 is a diagram illustrating a hardware configuration of the wireless communication device (UE) according to the present embodiment.

Here, a hardware configuration of the UE 10 according to the present embodiment is explained with reference to FIG. 3. FIG. 3 is a diagram illustrating the hardware configuration of the wireless communication device (UE) 10 according to the present embodiment. As illustrated in FIG. 3, the UE 10 includes an antenna 10a, a wireless transceiver unit 10b, a signal processing unit 10c, a PCM (Pulse Code Modulation) codec 10d, an amplifier 10e, a speaker 10f, an amplifier 10g, a microphone 10h, and a clock circuit 10i. Furthermore, the UE 10 includes an operation unit 10j, a display unit 10k, a central processing unit (CPU) 10l, and a storage unit 10m.

The antenna 10a receives a signal transmitted from the 1×+HRPD network 20 or the LTE network 30, and transmits a signal to the 1×+HRPD network 20 or the LTE network 30. The wireless transceiver unit 10b performs wireless communication with the 1×+HRPD network 20 or the LTE network 30 via the antenna 10a. The signal processing unit 10c demodulates a received signal received by the wireless transceiver unit 10b and extracts digital data. Furthermore, the signal processing unit 10c modulates input digital data and sends the modulated data to the wireless transceiver unit 10b. The PCM codec 10d extracts voice data from digital data into which a received signal is demodulated by the signal processing unit 10c. Furthermore, the PCM codec 10d converts voice data input from the microphone 10h via the amplifier 10g into digital data.

The amplifier 10e amplifies a voice signal input from the PCM codec 10d. The speaker 10f outputs a voice signal as voice. The amplifier 10g amplifies a voice signal input from the microphone 10h. The microphone 10h inputs voice as a voice signal. The clock circuit 10i provides a timer function and a clock function to the CPU 10l. The operation unit 10j accepts various operations made by a user. The display unit 10k displays thereon various information to a user of the UE 10.

The storage unit 10m includes a read-only memory (ROM) and a random access memory (RAM). The CPU 10l and the storage unit 10m realize functions of, for example, the location-registration control unit 102, the voice-communication-request acquiring unit 103, the voice-communication determining unit 104, the voice-communication control unit 105, and the voice-communication-disconnection-request acquiring unit 106 illustrated in FIG. 2. For example, the storage unit 10m has stored various programs realizing the processes performed by the location-registration control unit 102, the voice-communication-request acquiring unit 103, the voice-communication determining unit 104, the voice-communication control unit 105, and the voice-communication-disconnection-request acquiring unit 106 illustrated in FIG. 2 in the ROM. The CPU 10l and the RAM of the storage unit 10m read out and execute these programs, thereby generating processes realizing the above-described functions.

Figure 4:
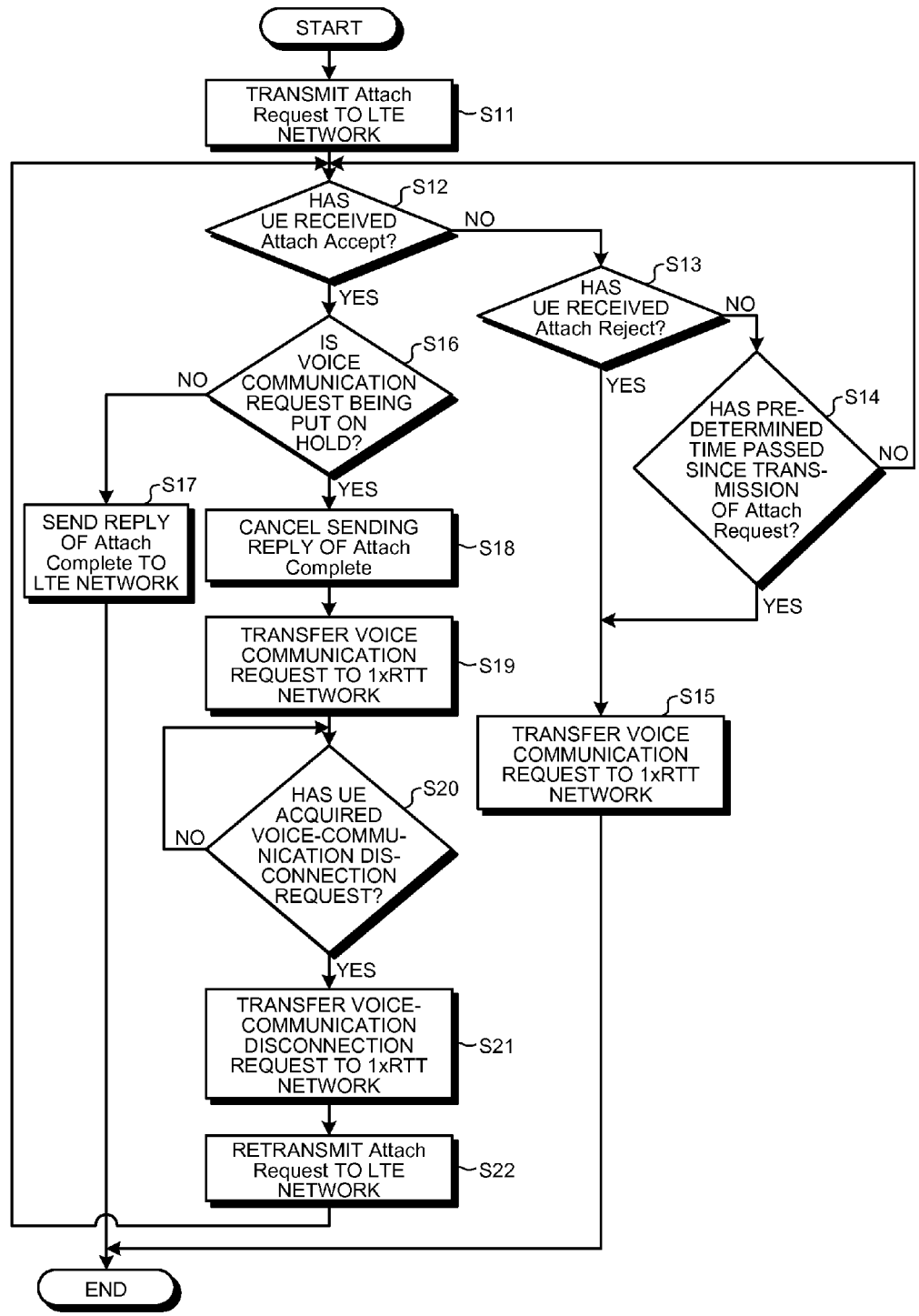
FIG. 4 is a flowchart illustrating a processing procedure performed by the wireless communication device (UE) according to the present embodiment.

Subsequently, a processing procedure performed by the UE 10 according to the present embodiment is explained with reference to FIG. 4. FIG. 4 is a flowchart illustrating the processing procedure performed by the wireless communication device (UE) 10 according to the present embodiment.

As illustrated in FIG. 4, the location-registration control unit 102 of the UE 10 transmits an Attach Request to the LTE network 30 (Step S11).

Until a predetermined time has passed since the Attach Request was transmitted (NO at Step S12, NO at Step S13, and NO at Step S14), returning the process to Step S12, the location-registration control unit 102 waits for a response from the LTE network 30.

When a response received from the LTE network 30 is an Attach Reject (YES at Step S13), or when the predetermined time has passed since the transmission of the Attach Request (YES at Step S14), the location-registration control unit 102 moves the process into Step S15.

At Step S15, the voice-communication control unit 105 transfers a voice communication request being put on hold in the voice-communication-request acquiring unit 103 to the 1×RTT network 20a.

On the other hand, when a response received from the LTE network 30 is an Attach Accept (YES at Step S12), the location-registration control unit 102 notifies the voice-communication determining unit 104 of the response of an Attach Accept. When having received the notification that the response received from the LTE network 30 is the Attach Accept, the voice-communication determining unit 104 determines whether the voice communication request acquired by the voice-communication-request acquiring unit 103 is being put on hold (Step S16).

When the voice-communication control unit 105 has received a determination result indicating that the voice communication request is not being put on hold from the voice-communication determining unit 104 (NO at Step S16), the voice-communication control unit 105 controls the location-registration control unit 102 to send a reply of an Attach Complete to the LTE network 30 (Step S17). Consequently, a wireless link between the UE 10 and the LTE network 30 is established, and packet communication between the UE 10 and the LTE network 30 is initiated.

On the other hand, when the voice-communication control unit 105 has received a determination result indicating that the voice communication request is being put on hold from the voice-communication determining unit 104 (YES at Step S16), the voice-communication control unit 105 controls the location-registration control unit 102 to cancel sending a reply of an Attach Complete to the LTE network 30 (Step S18). Then, the voice-communication control unit 105 transfers the voice communication request acquired by the voice-communication-request acquiring unit 103 to the 1×RTT network 20a of the 1×+HRPD network 20 (Step S19). Consequently, a wireless link between the UE 10 and the 1×RTT network 20a is established, and voice communication between the UE 10 and the 1×RTT network 20a is initiated.

When the voice communication between the UE 10 and the 1×RTT network 20a has been initiated, the voice-communication control unit 105 waits until a voice-communication disconnection request is acquired by the voice-communication-disconnection-request acquiring unit 106 (NO at Step S20). When a voice-communication disconnection request has been acquired by the voice-communication-disconnection-request acquiring unit 106 (YES at Step S20), the voice-communication control unit 105 transfers the acquired voice-communication disconnection request to the 1×RTT network 20a (Step S21). Consequently, the wireless link between the UE 10 and the 1×RTT network 20a is broken, and the voice communication between the UE 10 and the 1×RTT network 20a is terminated. Then, when the voice-communication disconnection request has been transferred to the 1×RTT network 20a by the voice-communication control unit 105, the location-registration control unit 102 retransmits the Attach Request to the LTE network 30 (Step S22), and returns the process to Step S12.

Figure 5:
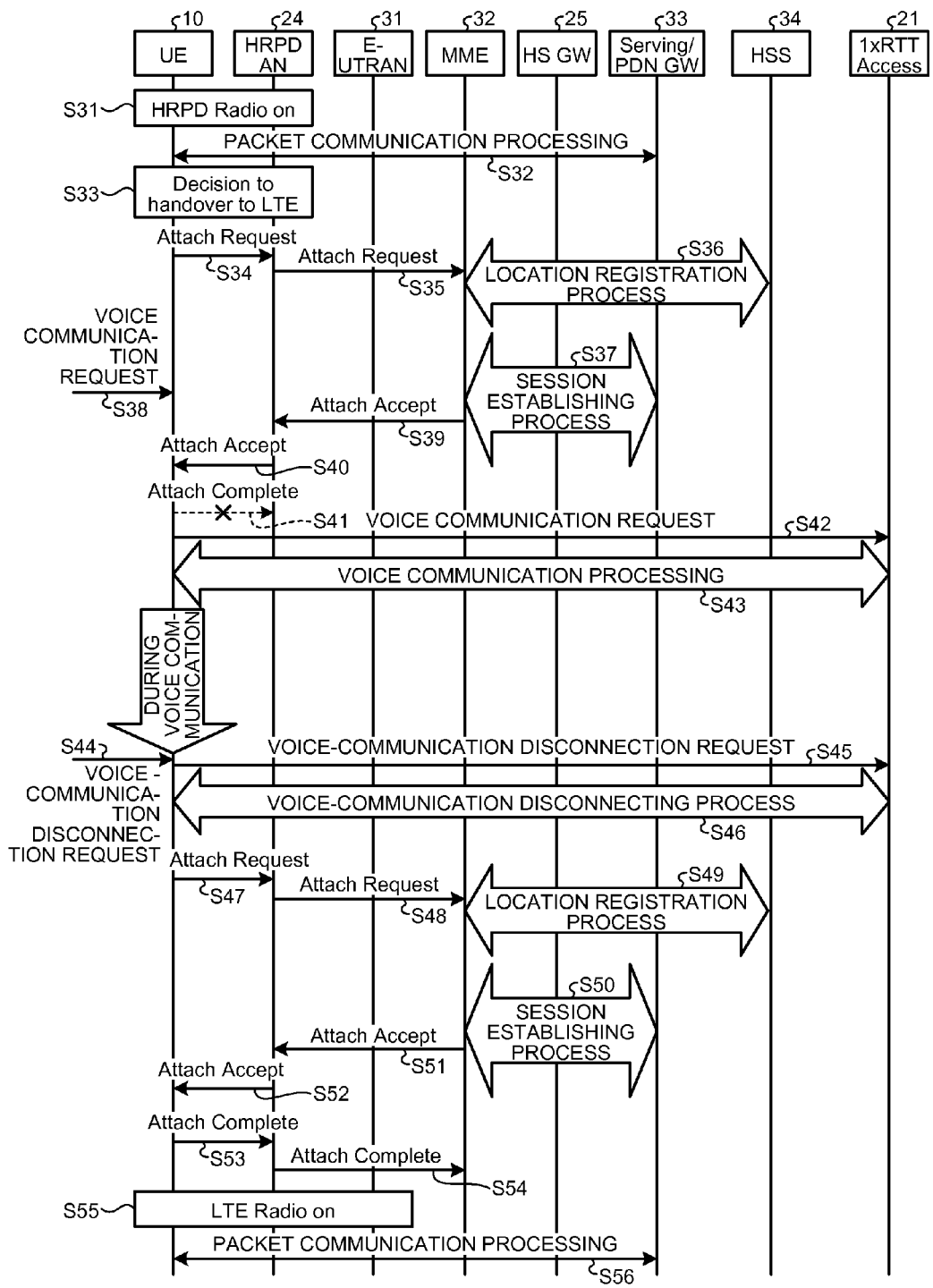
FIG. 5 is a sequence diagram illustrating the flow of processing by devices included in the mobile communication system according to the present embodiment when the UE hands over from a 1×+HRPD network to an LTE network.

Subsequently, the flow of processing by the devices included in the mobile communication system according to the present embodiment when the UE 10 hands over from the 1×+HRPD network 20 to the LTE network 30 is explained with reference to FIG. 5. FIG. 5 is a sequence diagram illustrating the flow of processing by the devices included in the mobile communication system according to the present embodiment when the UE 10 hands over from the 1×+HRPD network 20 to the LTE network 30. FIG. 5 illustrates respective processing procedures of the devices from when the UE 10 executes voice communication with the 1×RTT network 20a of the 1×+HRPD network 20 till when the UE 10 completes the handover to the LTE network 30.

As illustrated in FIG. 5, the UE 10 establishes a wireless link with the HRPD AN 24 of the HRPD network 20b (Step S31), and performs packet communication with the Serving/PDN GW 33 via the HRPD AN 24 (Step S32). Then, the UE 10 decides to execute handover from the 1×+HRPD network 20 to the LTE network 30 (Step S33).

The UE 10, which has decided to execute the handover to the LTE network 30, transmits an Attach Request requesting for location registration to the LTE network 30 to the HRPD AN 24 (Step S34). When having received the Attach Request, the HRPD AN 24 transfers the received Attach Request to the MME 32 of the LTE network 30 (Step S35).

When having received the Attach Request, the MME 32 performs a location registration process in cooperation with the HSS 34 (Step S36). When having received the Attach Request, the HSS 34 records information that the UE 10 has been connected to a subordinate of the MME 32.

When the MME 32 has completed the location registration process, the MME 32 performs a session establishing process to establish a session with the Serving/PDN GW 33 (Step S37).

While the location registration process and the session establishing process are performed on the side of the LTE network 30, the UE 10 acquires a voice communication request requesting the 1×RTT network 20a for the execution of voice communication (Step S38). Furthermore, the UE 10 puts the transfer of the acquired voice communication request to the 1×RTT Access 21 of the 1×+HRPD network 20 on hold.

When the MME 32 has completed the session establishing process, the MME 32 transmits an Attach Accept indicating acceptance of the Attach Request to the HRPD AN 24 (Step S39). When having received the Attach Accept, the HRPD AN 24 transfers the received Attach Accept to the UE 10 (Step S40).

As a response received from the LTE network 30 is the Attach Accept, the UE 10 determines whether the voice communication request is being put on hold. As the voice communication request is being put on hold at Step S38, the UE 10 cancels sending a reply of an Attach Complete to the LTE network 30 (Step S41). Consequently, a wireless link between the UE 10 and the LTE network 30 is not established, and the handover to the LTE network 30 is disrupted. Then, the UE 10 transfers the voice communication request being put on hold at Step S38 to the 1×RTT Access 21 of the 1×RTT network 20a (Step S42). Consequently, a wireless link between the UE 10 and the 1×RTT network 20a is established, and voice communication between the UE 10 and the 1×RTT network 20a is initiated (Step S43).

Then, the UE 10 acquires a voice-communication disconnection request requesting for disconnection of the voice communication performed by the 1×RTT network 20*a* (Step S44). Then, the UE 10 transfers the voice-communication disconnection request acquired at Step S44 to the 1×RTT Access 21 (Step S45). Consequently, the wireless link between the UE 10 and the 1×RTT network 20*a* is broken, and the voice communication between the UE 10 and the 1×RTT network 20*a* is disconnected (Step S46).

When having transferred the voice-communication disconnection request to the 1×RTT Access 21, the UE 10 retransmits the Attach Request to the LTE network 30 to the HRPD AN 24 (Step S47). When having received the Attach Request, the HRPD AN 24 transfers the received Attach Request to the MME 32 of the LTE network 30 (Step S48).

When having received the Attach Request, the MME 32 performs a location registration process in cooperation with the HSS 34 (Step S49). When having completed the location registration process, the MME 32 performs a session establishing process to establish a session with the Serving/PDN GW 33 (Step S50).

When the MME 32 has completed the session establishing process, the MME 32 transmits an Attach Accept to the HRPD AN 24 (Step S51). When having received the Attach Accept, the HRPD AN 24 transfers the received Attach Accept to the UE 10 (Step S52).

As a response received from the LTE network 30 is the Attach Accept, the UE 10 determines whether the voice communication request is being put on hold. As the voice communication request is not being put on hold, the UE 10 sends a reply of an Attach Complete to the LTE network 30 to the HRPD AN 24 (Step S53). When having received the Attach Complete, the HRPD AN 24 transfers the received Attach Complete to the MME 32 (Step S54). Consequently, a wireless link between the UE 10 and the E-UTRAN 31 of the LTE network 30 is established (Step S55), and packet communication between the UE 10 and the LTE network 30 is initiated (Step S56).

As described above, when the UE 10 according to the present embodiment has acquired a voice communication request to the 1×RTT network 20*a* before receiving an Attach Accept after the transmission of an Attach Request, the UE 10 puts the transfer of the voice communication request to the 1×RTT network 20*a* on hold. Then, when having received an Attach Accept, the UE 10 cancels sending a reply of an Attach Complete to the LTE network 30. Then, the UE 10 transfers the voice communication request being put on hold to the 1×RTT network 20*a*. Therefore, even when having had a voice communication request during execution of handover to the LTE network 30 for performing packet communication, the UE 10 according to the present embodiment can suspend the handover and continue to perform voice communication processing, and consequently can properly execute the voice communication.

Furthermore, when a voice-communication disconnection request has been transferred to the 1×RTT network 20*a*, the UE 10 according to the present embodiment retransmits the Attach Request to the LTE network 30. Therefore, the UE 10 according to the present embodiment can restart the handover to the LTE network 30 promptly after termination of the voice communication.

According to one aspect of a wireless communication device discussed in the present application, even when having had a voice communication request during execution of handover to a communication network for performing packet communication, the wireless communication device can properly execute the voice communication.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A wireless communication device comprising:
   a location-registration control unit that transmits, when handover from a first communication network for performing voice communication and packet communication to a second communication network for performing packet communication is determined to be executed, a location registration request requesting for location registration to the second communication network and receives a response to the location registration request from the second communication network;
   a voice-communication-request acquiring unit that puts a voice communication request on hold when acquiring the voice communication request requesting the first communication network for performing voice communication;
   a voice-communication determining unit that determines whether the voice communication request acquired by the voice-communication-request acquiring unit is being put on hold when the response received by the location-registration control unit is acceptance of the location registration request; and
   a voice-communication control unit that sends a reply of completion notification notifying of completion of receipt of the acceptance to the second communication network when the voice-communication determining unit has determined that the voice communication request is not being put on hold, or cancels the sending of the reply of completion notification and transfers the voice communication request being put on hold to the first communication network when the voice-communication determining unit has determined that the voice communication request is being put on hold.

2. The wireless communication device according to claim 1, wherein
   the voice-communication control unit also transfers the voice communication request put on hold by the voice-communication-request acquiring unit to the first communication network when the response received by the location-registration control unit is rejection of the location registration request.

3. The wireless communication device according to claim 1, further comprising a voice-communication-disconnection-request acquiring unit that acquires a voice-communication disconnection request requesting for disconnection of voice communication performed by the first communication network, wherein
   the voice-communication control unit transfers the voice-communication disconnection request acquired by the voice-communication-disconnection-request acquiring unit to the first communication network, and
   the location-registration control unit retransmits the location registration request to the second communication network when the voice-communication disconnection request has been transferred to the first communication network by the voice-communication control unit.

4. A wireless communication method performed by a wireless communication device, the wireless communication method comprising:

transmitting, when handover from a first communication network for performing voice communication and packet communication to a second communication network for performing packet communication is determined to be executed, a location registration request requesting for location registration to the second communication network and receiving a response to the location registration request from the second communication network;

putting a voice communication request on hold when the wireless communication device acquires the voice communication request requesting the first communication network for performing voice communication;

determining whether the acquired voice communication request is being put on hold when the received response is acceptance of the location registration request; and sending a reply of completion notification notifying of completion of receipt of the acceptance to the second communication network when it has been determined that the voice communication request is not being put on hold, or cancelling the sending of the reply of completion notification and transferring the voice communication request being put on hold to the first communication network when it has been determined that the voice communication request is being put on hold.

* * * * *